Figure 1:
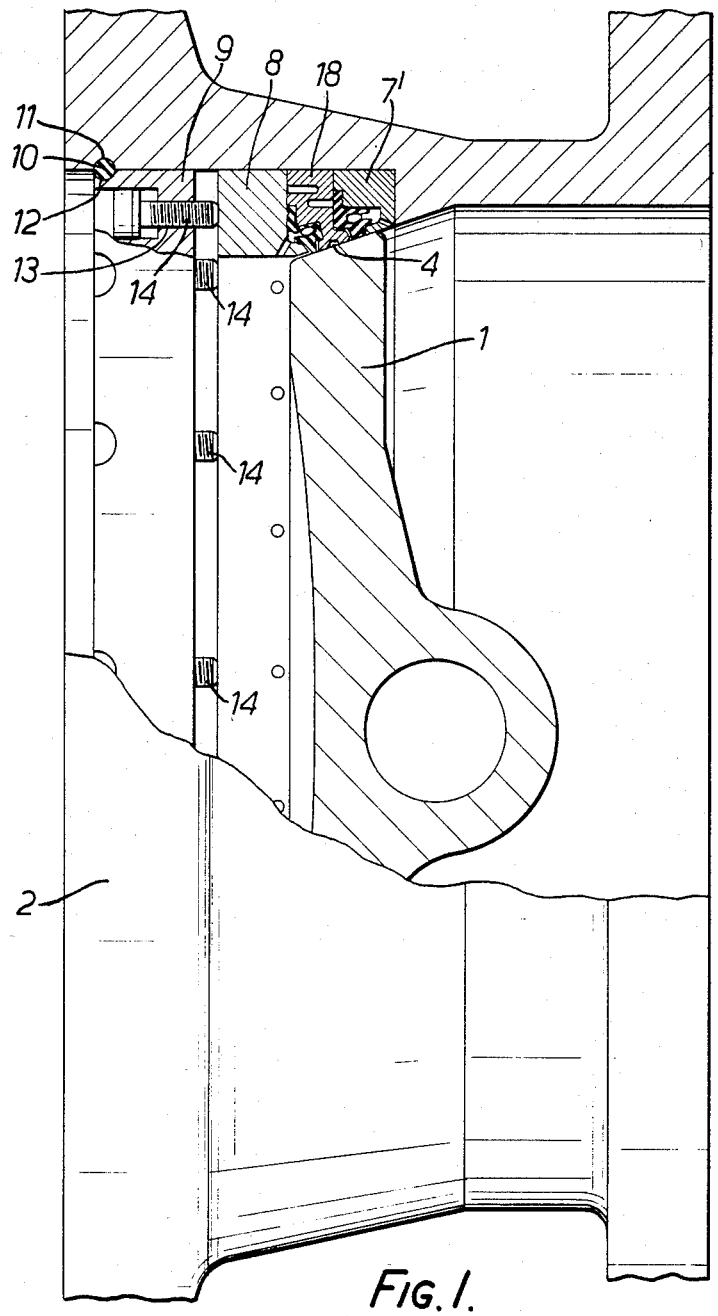

United States Patent [19]

Rishovd et al.

[11] Patent Number: 4,513,765
[45] Date of Patent: Apr. 30, 1985

[54] ARRANGEMENT ON A BUTTERFLY VALVE

[75] Inventors: Erik Rishovd; Sven Sorensen, both of Geithus, Norway

[73] Assignee: A/S Westad Armaturfabrik, Geithus, Norway

[21] Appl. No.: 433,410

[22] Filed: Oct. 7, 1982

[30] Foreign Application Priority Data

Oct. 14, 1981 [NO] Norway ................................ 813467

[51] Int. Cl.³ .............................................. F16K 1/22
[52] U.S. Cl. ..................................... 137/72; 251/173; 251/306
[58] Field of Search ............... 251/305, 306, 307, 308, 251/173; 137/72, 74

[56] References Cited

U.S. PATENT DOCUMENTS

| | | | |
|---|---|---|---|
| 4,005,848 | 2/1975 | Eggleston | 251/307 |
| 4,113,268 | 9/1978 | Simmons et al. | 251/306 |
| 4,130,285 | 12/1978 | Whitaker | 251/306 |
| 4,195,815 | 4/1980 | Stager | 251/306 |
| 4,244,387 | 1/1981 | Snape | 251/306 |

FOREIGN PATENT DOCUMENTS 2524895 12/1975 Fed. Rep. of Germany ...... 251/307

55-10104 1/1980 Japan ................................ 251/306

Primary Examiner—Martin P. Schwadron
Assistant Examiner—James R. Shay
Attorney, Agent, or Firm—Cushman, Darby & Cushman

[57] ABSTRACT

Butterfly valve comprising a valve housing and a flap and two soft sealing rings retained by undercut grooves in the valve housing and from said grooves radially inwardly projecting sealing lips for engagement with the sealing surface of the flap. By means of the two soft sealing rings which are separated by a flexible intermediate ring (18) of metal, the radial inner edge thereof is formed with two opposite directed sealing lips, a complete fluid sealing in both pressure directions is obtained. In the event of destruction of the soft sealing rings caused by eventual fire in the valve, the pressure of the fluid will result in deformation or flexing of the intermediate ring, so that the one or the other of the sealing lips is pressed against the sealing surface of the flap and, thereby obtaining a fire proof seal in both directions. Said flexing or deformation of the intermediate ring is obtained by means of a weakened central cross sectional section provided by means of at least one, preferably two circular grooves in the lateral opposing surfaces of the intermediate ring.

4 Claims, 2 Drawing Figures

ARRANGEMENT ON A BUTTERFLY VALVE

The present invention relates to an arrangement on a fireproof butterfly valve, intended especially for use with cryogenic fluids, of the type recited in the preamble of the appurtenant claim 1.

In the event of fire in butterfly valves of the type known, e.g., from Norwegian Pat. No. 131,003, the sealing ring of inelastic material such as PFEP or the like, also called a "soft sealing ring", may burn up, which results in some leakage or passage of fluid between the sealing surface of the valve flap and the inner wall of the valve housing. To prevent or reduce this flow, it is known, as disclosed in U.S. Pat. No. 4,244,387 and W. German Pat. No. 2,524,895, to place an intermediate ring or support ring of metal between two soft sealing rings in the valve housing. In case of fire, the metal ring will seal against the sealing surface of the flap and substantially prevent flow in one or the other direction of flow. This seal is obtained in that the mounting of the, flap becomes destroyed in a fire, so that the flap, owing to the prevailing pressure in the valve, is pushed into contact against the intermediate ring.

Further it is known from United Kingdom patent publication No. 2013310-A to place a metal sealing ring with a flexible lip together with a conventional soft sealing ring in the butterfly valve housing. If the soft sealing ring becomes destroyed in a fire, the flexible lip on the metal sealing ring will be pressed into contact against the sealing surface of the flap owing to different coefficients of temperature expansion between the lip on the metal sealing ring and a clamping ring which holds the soft sealing ring and the metal sealing ring in position in the valve housing. U.S. Pat. No. 4.220.172 also teaches a combination of a soft sealing ring and a metal sealing ring, in which the metal sealing ring in the event of fire and consequent damage to the soft sealing ring, is capable of coming into sealing contact against the sealing surface of the flap to close the valve to leakage in both directions of flow.

The object of the present invention is to provide a butterfly valve of the above type wherein the intermediate ring, in the event of fire and consequent destruction of the soft sealing ring, effects essentially complete closure in both directions of flow, the intermediate ring of metal being brought into contact against the sealing surface of the flap by means of the prevailing pressure in the valve.

This object is obtained in accordance with the invention by means of the characteristic features disclosed in the characterizing clause of the appurtenant claim 1 and the succeeding dependent claims. Owing to the special configuration of the flexible intermediate ring, it will become deformed and flexed in one or the other direction, depending on the direction of pressure, thereby coming into contact against the sealing surface of the flap and preventing any throughflow of fluid, or keeping any flow to a minimum.

Figure 2:
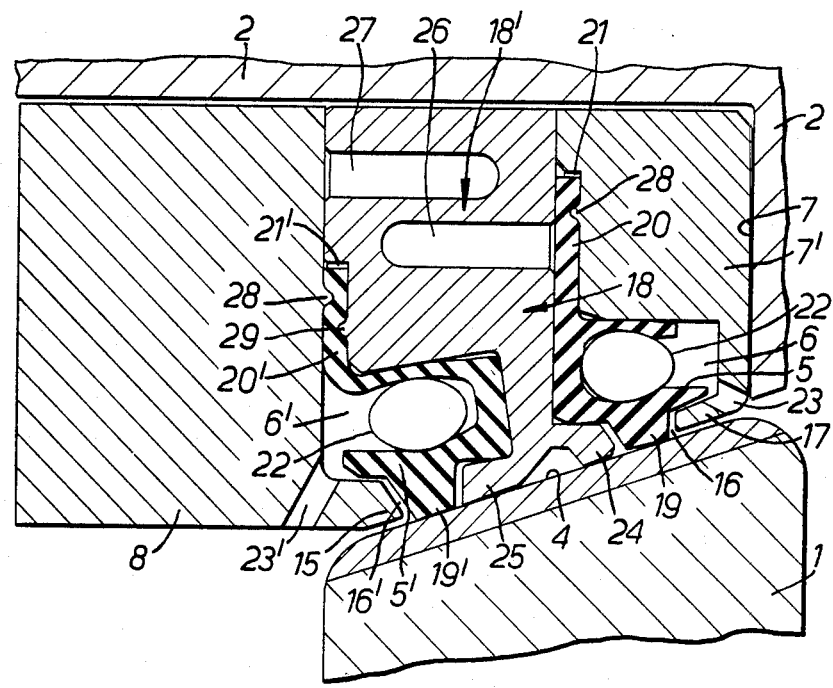

An embodiment example of the butterfly valve will be described in the following with reference to an embodiment illustrated schematically in the accompanying drawings, wherein:

FIG. 1 shows a longitudinal section through the butterfly valve with the flap in a closed position and in an open position, and FIG. 2 shows the sealing surface of the flap and the adjacent parts of the valve housing with the soft sealing rings and flexible intermediate mediate ring, in cross section.

FIG. 1 shows a butterfly valve comprising an eccentrically mounted flap 1 in a valve housing 2. The axis of rotation 3 of the flap is displaced in relation to a central plane through the spherical sealing surface 4 of the flap, which cooperates with two sealing rings 5, 5' disposed in internal grooves 6, 6' in the valve housing 2. The internal grooves 6, 6' are provided, respectively, between a circular seat 7 in the wall of the valve housing 2 and a flexible intermediate ring 18 of metal, and between said intermediate ring 18 and a retainer ring 8 which can be pressed against the sealing ring 5 with the aid of suitable means such as, for example, a ring 9 disposed outside and in spaced relation from the retainer ring 8. The ring 9 is secured against axial movement in the valve housing 2 in a direction away from the flap 1 by means of a securing ring 10 disposed in a groove 11 in the wall of the valve housing and engaging with a recess 12 in the ring 9. In the ring 9, a plurality of threaded bores 13 are provided for screw bolts 14 which, when tightened, are brought into contact with the retainer ring 8 which thereby, together with the intermediate ring 18, holds the sealing rings 5, 5' firmly in place. FIG. 2 shows in greater detail the grooves 6, 6' with the sealing rings 5,5', the retainer ring 8 and the intermediate ring 18. It may clearly be seen that the sealing rings 5, 5' are disposed in undercut grooves 6, 6'. The groove 6' is defined by a circular lip 15 on the retainer ring 8 which projects outwardly and reduces the opening 16' of the groove 6' and on the opposite side, said opening is restricted by a corresponding lip 25 at the radial, inner section of the intermediate ring 18. A corresponding, opposing lip 24 on the intermediate ring 18 similarly restricts the opening 16 of the groove 6 together with an opposing corresponding lip 17 on the mounting ring 7'. The two opposing lateral surfaces of the intermediate ring and the adjacent lateral surfaces of the retainer ring 8 and the mounting ring 7', respectively, are thus shaped so as to form between them said grooves 6, 6' for retaining the soft sealing rings 5, 5'. The sealing rings 5, 5' which are retained between the intermediate ring 18 and, respectively, the mounting ring 7' and the retainer ring 8, are preferably made of PFEP material and have a U-shaped cross section. Each sealing ring has an inwardly projecting, radial sealing lip 19, 19' at the center section of one leg of the U, and an outwardly projecting, radial flange 20, 20' extending in the case of the ring 5 from the lateral edge at the bottom of the U and in the case of the ring 5' from the end of one leg of the U. The inwardly projecting sealing lips 19, 19' project out through the groove openings, or slits 16, 16' discussed above, and lie in contact with the spherical sealing surface 4 of the flap 1. The outwardly projecting radial flanges 20, 20' are clamped inside the circular space 21, 21' at the bottom of the grooves 6, 6' between the retainer ring 8 and the intermediate ring 18, and between the intermediate ring 18 and the mounting ring 7', respectively. Disposed inside the U of the sealing rings 5, 5' is an annular helical spring 22, preferably of stainless steel, which at the various temperature conditions in question presses the sealing rings 5, 5' and thereby the inwardly projecting sealing lips 19, 19' more or less firmly against the sealing surface 4 of the flap 1 when the butterfly valve is closed.

With fluid pressure in one or the other direction, the pressure will act on the soft sealing rings 5, 5' both directly and via bores 23, 23' in the mounting ring 7' and the retainer ring 8, respectively, so that the sealing lip 19 or 19' comes into contact against the sealing surface 4 of the flap 1. The interplay between the pressure which acts on the soft sealing rings 5, 5' and the influence of temperature on the rings and on the annular helical springs 22 disposed within the soft sealing rings, will not be discussed is further detail here as this is fully discussed in Norwegian Pat. No. 131.003.

The intermediate ring 18, as mentioned previously, is disposed between the soft sealing rings 5, 5', and in addition to its retainer function, its primary task is to serve as a fireproof seal in the event of fire in the valve which would destroy, i.e., burn up the soft sealing rings.

The intermediate ring 18 has a weakened central cross-sectional section 18' and at the radial, inner edge thereof is formed with two axially spaced, circular sealing lips 24, 25 of metal for engagement with the sealing surface 4 of the flap 1 if the intermediate ring 18 is subjected to pressure on one or the other side thereof. Such pressure occurs, for example, in connection with a fire, where the sealing rings are destroyed and the fluid presses directly on one side of the intermediate ring 18. This will result in an axial deformation/flexure of the inner radial section of the intermediate ring, causing one or the other of the sealing lips 24, 25 to be pressed into contact against the sealing surface 4 of the flap. Said deformation/flexure of the inner radial section of the intermediate ring is made possible by the above-mentioned weakening of the center section 18' of the intermediate ring. The weakened central cross-sectional section 18' of the intermediate ring is provided by means of at least one circular groove, or preferably, as shown in FIG. 2, two circular grooves 26, 27 in the respective lateral faces of the intermediate ring, thus forming a narrow, flexible section of material between the grooves. The circular grooves 26, 27 may have the same radial distance from the centerline of the valve, such that the narrow, flexible section of material will be located between the bottoms of the circular grooves 26, 27.

In the preferred embodiment illustrated in FIG. 2, however, the grooves 26, 27 are radially displaced relative to each other, and overlap each other axially, so that the flexible section of material is located between facing, lateral surfaces of the circular grooves. In the event of fire in the valve, the intermediate ring will operate as follows when the sealing rings have become destroyed: The pressure of the fluid will press against the flexible intermediate ring 18. The cross section of the ring will flex like a spring owing to the weakening of its central section 18' discussed above and rotate about a point in the weakened section. One or the other of the sealing lips 24, 25, depending on the direction of pressure, will thereby be rotated toward the sealing surface 4 of the flap and produce a sealing pressure approximately proportional to the pressure of the fluid.

Having described our invention, we claim:

1. An arrangement on a fireproof butterfly valve, having a converging sealing surface, intended especially for use with cryogenic fluids, wherein the axis of rotation of the flap is displaced in relation to a plane through the spherical sealing surface of the flap, which cooperates with two soft sealing rings disposed in the valve housing and separated by an intermediate ring of metal, opposing lateral surfaces of said intermediate ring being of complementary configuration in relation to the facing lateral surfaces of the sealing rings for retaining the sealing rings in undercut grooves formed between said opposing lateral surfaces of the intermediate ring and, respectively, a retainer ring and a circular seat in the wall of the valve housing, said undercut grooves each having a radial, inwardly open slit through which a radial, inwardly projecting sealing lip on the sealing rings extends for engagement with the sealing surface of the flap when the flap is in a closed position, said sealing rings being of the type which are affected by both spring pressure and fluid pressure, characterized in that the intermediate ring has a weakened central cross-sectional section and at the radial, inner edge thereof is formed with two axially spaced, circular sealing lips of metal for engagement with the sealing surface of the flap of which one of the sealing lips has a radius greater than the other according to the convergence of the sealing surface when the intermediate ring is subjected to forces of pressure from one or the other side, said pressure causing axial deformation/flexure of said radial, inner section and axial displacement of the lips of the intermediate ring from a plane through the flexure points of the radial, inner section whereby one or the other of the sealing lips is pressed into contact against the sealing surface of the flap, thereby obtaining a fireproof seal in the event of fire in the valve which destroys the soft sealing rings.

2. A valve arrangement according to claim 1, characterized in that the weakened central cross-sectional section of the intermediate ring is provided by means of at least one circular groove in each lateral surface of the intermediate ring, forming a narrow, flexible section of material between said grooves.

3. A valve arrangement according to claim 2, characterized in that the grooves are radially displaced in relation to each other and overlap each other axially.

4. An arrangement on a fireproof butterfly valve, having a converging sealing surface, intended especially for use with cryogenic fluids, wherein the axis of rotation of the flap is displaced in relation to a plane through the spherical sealing surface of the flap, which cooperates with two soft sealing rings disposed in the valve housing and separated by an intermediate ring of metal, opposing lateral surfaces of said intermediate ring being of complementary configuration in relation to the facing lateral surfaces of the sealing rings for retaining the latter in undercut grooves formed between said opposing lateral surfaces of the intermediate ring and, respectively, a retainer ring and a circular seat in the wall of the valve housing, said undercut grooves each having a radial, inwardly open slit through which a radial, inwardly projecting sealing lip on the sealing rings extends for engagement with the sealing surface of the flap when the flap is in a closed position, said sealing rings being of the type which are affected by both spring pressure and fluid pressure, characterized in that the intermediate ring has a weakened central cross-sectional section and at the radial, inner edge thereof is formed with two axially spaced, circular sealing lips of metal of which the one sealing lip having the greater radius according to the convergence of the flap sealing surface, is axially displaced from a plane through the flexure points of the weakened sections of the intermediate ring, in the direction opposite of said convergence and at least beyond the point of intersection between a normal from said flexure point to the flap sealing surface, for engagement with the sealing surface of the flap when the intermediate ring is subjected to forces of pressure from one or the other side, said pressure causing axial deformation/flexure of said radial, inner section whereby one or the other of the sealing lips is pressed into contact against the sealing surface of the flap, thereby obtaining a fireproof seal in the event of fire in the valve which destroys the soft sealing rings.

* * * * *